United States Patent

Broekhuis et al.

[11] Patent Number: 5,952,459
[45] Date of Patent: Sep. 14, 1999

[54] POLYMERIC AMINES

[75] Inventors: Antonius Augustinus Broekhuis; Jan Freriks, both of Amsterdam, Netherlands

[73] Assignee: Shell Oil Company, Houston, Tex.

[21] Appl. No.: 09/045,096

[22] Filed: Mar. 20, 1998

[30] Foreign Application Priority Data

Mar. 24, 1997 [EP] European Pat. Off. ............. 97200868

[51] Int. Cl.$^6$ ............. C08G 67/02; C08G 73/00
[52] U.S. Cl. ............. 528/423; 528/422; 528/392
[58] Field of Search .................. 528/392, 423, 528/422

[56] References Cited

U.S. PATENT DOCUMENTS

| | | | |
|---|---|---|---|
| 2,495,286 | 1/1950 | Brubaker | 260/63 |
| 2,846,406 | 5/1958 | Kleiner et al. | 260/2.1 |
| 4,024,326 | 5/1977 | Hudgin | 526/11.1 |

FOREIGN PATENT DOCUMENTS

| | | | |
|---|---|---|---|
| 0 121 965 A2 | 10/1984 | European Pat. Off. | |
| 0 181 014 A1 | 5/1986 | European Pat. Off. | |
| 0 372 602 A2 | 6/1990 | European Pat. Off. | C08G 67/02 |
| 0 516 238 A1 | 12/1992 | European Pat. Off. | |
| 0 522 635 A1 | 1/1993 | European Pat. Off. | |
| WO 95/04324 | 2/1995 | WIPO | |
| WO 96/13549 | 5/1996 | WIPO | C08L 73/100 |

OTHER PUBLICATIONS

Macromolecules 1989, 22, 2014–2015. Copyright 1989 American Chemical Society.

Remir G. Kostyanovsky et al., "New Scope and Limitations in the Knorr–Paal Synthesis of Pyrroles," *Mendeleev Commun.*, 1993.

*Primary Examiner*—P. Hampton-Hightower

[57] ABSTRACT

Polymeric amines are provided that have N-substituted 2,5-pyrrolediyl groups incorporated in the backbone wherein the N-substituted 2,5-pyrrolediyl group may be represented by the general formula (I)

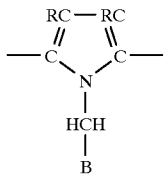

(I)

wherein R independently represents a hydrogen atom or a hydrocarbyl group and wherein B represents the substituent containing at least one primary amino group.

10 Claims, No Drawings

POLYMERIC AMINES

FIELD OF THE INVENTION

The present invention relates to new polymeric amines that have N-substituted 2,5-pyrrolediyl groups incorporated in the backbone. The present invention also relates to a process for the preparation of such new polymeric amines, to curable resin compositions and to glued products, glued wood products in particular.

BACKGROUND OF THE INVENTION

Polymeric amines having 2,5-pyrrolediyl groups (that is, pyrrolic units) in the backbone are known. For instance, in EP-A-0,400,903 a family of pyrrolic derivatives of ethylene/alpha-olefin/carbon monoxide terpolymers is described. These polymeric amines are prepared in a Knorr-Paal type reaction, that is, by reacting the linear olefin-carbon monoxide polymer with ammonia or an amine selected from $C_1$ to $C_{50}$ primary alkylamines, benzylamine and substituted benzylamines. In EP-A-0,400,903 references to further polymeric amines can be found.

According to EP-A-0,400,903 the polymeric amines therein disclosed might well find application as speciality plastics. It would, however, be more advantageous if the polymeric amines have functional groups that allow use in curable resin compositions and other bulk uses.

A further example of the Knorr-Paal type reaction may be found in WO 93/19114. In that case the olefin-carbon monoxide polymer is reacted with an amino acid or a derivative thereof, resulting in polymeric amines having carboxyl functionality or a functionality convertible thereto. These polymeric amines have not found a specific use either. This may be attributed to the less than ideal applicability of carboxyl functionalized polymeric amines, e.g., they are not suitable for fast curing thermosets. Therefore it remains desirable to extend the family of polymeric amines having functional groups other than the carboxyl functionality. The amine reactant in the Knorr-Paal reaction need not be a monoamine. For example, in EP-A-0,372,602 the olefin-carbon monoxide polymers are reacted with polyamines. However, these polymeric amines are cross-linked and therefore less applicable in, for example, curable resin compositions.

SUMMARY OF THE INVENTION

Surprisingly novel polymeric amines have been found that have greater applicability than the aforementioned polymeric amines. Accordingly, the invention provides polymeric amines that have N-substituted 2,5-pyrrolediyl groups incorporated in the backbone wherein the pyrrolic nitrogen atoms are substituted with a group having primary amino functionality. The N-substituted 2,5-pyrrolediyl group may be represented by the general formula (I)

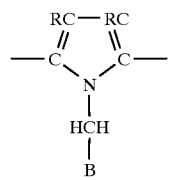

(I)

wherein R independently represents a hydrogen atom or a hydrocarbyl group and wherein B represents the substituent containing at least one primary amino group.

DETAILED DESCRIPTION OF THE INVENTION

The substituent B typically is a substituted group of 1 up to 100 atoms having at least one primary amino group attached to it. Suitably, these atoms are carbon atoms, but the substituted group may also contain one or more nitrogen, sulphur or oxygen atoms in its backbone. Preferably, the substituent B has a single primary amino group attached to it that has a lower Knorr-Paal reactivity than aminoethane. This differential reactivity can be tested or determined by the procedure described in Example 5 of this specification.

The substituent B may bear other functional groups provided these groups also have a lower Knorr-Paal reactivity than aminoethane. More preferably the substituent B has a sterically hindered primary amino group attached to it.

The expression "sterically" hindered typically refers to atoms or groups larger than hydrogen atoms on adjacent atoms. For instance, in 1,2-propanediamine, the amino group on the 2 position is sterically hindered by the methyl group forming the third carbon atom of the propane backbone, whereas the amino group on the 1 position is not sterically hindered.

These sterically hindered substituents may be represented by the general formula

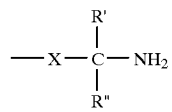

wherein X is a hydrocarbylene or heterocarbylene group of up to 99 preferably up to 20 atoms, R' and R" each individually represent a hydrocarbyl or heterocarbyl group of up to 20 preferably up to 10 atoms or R" is a hydrogen atom.

Suitable examples of substituents B include: 1-aminoethyl; 1- or 2-aminopropyl; 1-, 2- or 3-aminobutyl; 2-amino-2-methylpropyl; 4-amino-2-oxapentyl; 7-amino-2,4-diazaoctyl; 4-amino-3,5-di-tert-butylphenyl and polyether substituents such as $NH_2$—$CH(CH_3)$—$(O$—$CHR$—$CH_2)_n$—$O$—$CHR$—.

Each R in formula (I) may independently be a hydrogen atom or a hydrocarbyl group. Suitable hydrocarbyl groups comprise phenyl and substituted aryl groups; methyl and other alkyl groups of up to 12 carbon atoms; and methoxy and other alkoxy groups of up to 12 carbon atoms.

Preferably the R's in the N-substituted 2,5-pyrrolediyl group are either both hydrogen atoms, or a hydrogen atom and a methyl group respectively.

Besides the N-substituted 2,5-pyrrolediyl group, the novel polymeric amines may comprise substituted or unsubstituted alkadiyl groups and N-substituted 2,5-pyrrolediyl groups having no functionality or a functionality other than a primary amino group.

The novel polymeric amines of the invention may therefore be represented by the general formula

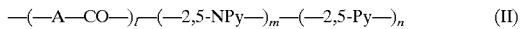

(II)

wherein each A independently represents a substituted or unsubstituted alkadiyl group; l, m and n are integers together representing the number of repeating units p whereby $1 \leq m \leq p$, preferably $2 \leq m \leq p$, $0 \leq l+n < p$ and $p \geq 3$; each 2,5-NPy represents the N-substituted 2,5 pyrrolediyl group wherein the pyrrolic nitrogen atom is substituted with a group having primary amino functionality, and each 2,5-Py represents an N-substituted 2,5-pyrrolediyl group having no functionality or a functionality other than a primary amino group.

It will be recognised that the repeating unit "(A—CO—)" corresponds the repeating unit of the olefin-carbon monoxide polymer of which the novel polymeric amines may be prepared. In random olefin-carbon monoxide polymers, as for instance found in U.S. Pat. No. 2,495,286, U.S. Pat. No. 2,846,406 or U.S. Pat. No. 4,024,326, the alkadiyl groups may each independently have from 2 up to 10,000 carbon atoms in the backbone. However, as indicated hereinafter, each A of this repeating unit is preferably a substituted or unsubstituted 1,2- or 1,3-alkadiyl group, more preferably a substituted or unsubstituted 1,2-alkadiyl group.

Finally, the repeating unit (2,5-Py) is a 2,5-pyrrolediyl group as defined above wherein the pyrrolic nitrogen atom bears, for instance, a hydrogen atom, an (optionally substituted) alkyl group, an (optionally substituted) aryl group, an (optionally substituted) alkenyl group, e.g., such as a secondary or tertiary aminoalkyl group, an acid group or -preferably an (N-pyrrole)alkyl group. The latter corresponds to novel polymeric amines whereby some polymer molecules have been coupled without, however, forming an insoluble polymeric system as in EP-A-0,372,602. For instance, up to 3 of such (N-pyrrole)alkyl groups may be present, although the actual number very much depends on the molecular weight of the polymer.

The integers m, l end n may vary widely, as long as m+l+n adds up to p. The integer p is preferably larger than 10, for instance in the range of 30 to 70. Suitably, l is in the range of $0 \leq l < 0.9p$ and m is in the range of $0.1p < m \leq p$. More suitably l is in the range of $0.2p \leq l \leq 0.5p$, and m is in the range of $0.5p \leq m \leq 0.8p$. The integer n equals p−(l+m) which may be zero up to 0.9p, suitably up to 0.3p.

The invention also relates to the process for preparing the novel polymeric amines of the invention. Accordingly, a process is provided for their preparation by reacting an olefin-carbon monoxide polymer with a primary amine of general formula (III)

$$H_2NCH_2—B \quad\quad\quad (III)$$

wherein B has the same meaning as set out above, under such conditions as to form the 2,5-pyrrolediyl groups without affecting the functional group attached to the substituent B.

Examples of suitable primary amines may be simply inferred from the examples of suitable substituents B mentioned above. Thus, when B is 1-aminoethyl, the primary amine is 1,2-diaminopropane. More in general, suitable amines include alpha-hydrocarbyl-alpha,omega-diaminohydrocarbons, wherein one or more carbon atoms may be replaced by heteroatoms, provided the last (omega) carbon atom to which the more reactive amino group is attached is a methylene group.

The olefin-carbon monoxide polymers that are used for the preparation of the novel polymeric amines may be perfectly alternating (molar ratio olefin:carbon monoxide equals 1:1 with 1,2-addition of the olefin), semiperfectly alternating (molar ratio olefin:carbon monoxide equals 1:1, but with some olefin addition other than 1,2) or random (e.g., having a carbonyl content of about 30 up to 50 mole percent as disclosed in U.S. Pat. No. 2,846,406). Regarding the latter group it should be observed that the theoretical degree of conversion is limited by the distribution of the carbonyl groups as 1,4-dicarbonyl entities across the polymer chain. Preferably the olefin-carbon monoxide is perfectly alternating or semiperfectly alternating.

The olefin-carbon monoxide polymer may be a "homopolymer" (with respect to the olefin), that is, when it is prepared from ethene, a (substituted) styrene, an olefinically unsaturated hydrocarbon such as vinyl acetate, ethyl acrylate and N-vinylpyrrolidone, an alpha-olefin or an internal olefin; or a "copolymer" (with respect to the olefin) when different olefins are used in its preparation. The polymer is prepared from olefins having from 2 up to 14 carbon atoms, in particular from alpha-olefins having from 2 to 8 carbon atoms (formation of polymers of still larger olefins is not attractive). Preferably, the olefin-carbon monoxide polymer is a homopolymer or copolymer of carbon monoxide and an olefin selected from ethene, propene and styrene. Particularly preferred are the perfectly alternating homopolymers of ethene and carbon monoxide or styrene and carbon monoxide; the perfectly or semiperfectly alternating homopolymers of propene and carbon monoxide; the perfectly alternating copolymers of ethene/styrene and carbon monoxide; and the perfectly or semiperfectly alternating copolymers of ethene/propene and carbon monoxide or propene/styrene and carbon monoxide.

In particular when the olefin-carbon monoxide polymer is an alternating homopolymer of an alpha-olefin having three or more carbon atoms, the alpha-olefin may be incorporated predominantly in a regioregular fashion or in a regio-irregular fashion. The use of a regio-irregular homopolymer or of a copolymer has the advantage in that its viscosity is lower than that of an otherwise comparable (regio-regular) homopolymer.

The olefin-carbon monoxide polymer may have a molecular weight ranging from 200 to 500,000 daltons. For application as curable resin or in a curable resin composition, the polymer suitably has a molecular weight ranging from 500 to 20,000 daltons. Preferably the polymer has a molecular weight in the range of 1,000 to 5,000 daltons, more preferably in the range of 2,000 to 3,500 daltons. In the context of this patent document the molecular weights are meant to be number-average molecular weights.

An advantage of using olefin-carbon monoxide polymers that have a relatively low molecular weight resides in the fact that they can be liquid at the temperatures in the range of 10–80° C., i.e., the temperatures generally used in the processing thereof.

The synthesis of the (preferred) olefin-carbon monoxide polymer is not part of this invention. Information thereon may be found in the cited patent specifications and in for instance EP-A-0,121,965, EP-0,181,014, EP-A-0,516,238 and EP-A-0,522,635, and the documents mentioned in the European search reports annexed thereto.

The olefin-carbon monoxide polymer may also be a polymer to which a vinyl monomer is grafted. The resulting graft polymer may have a higher water resistance and may have other (cost) benefits.

Grafting of the vinyl monomer to the polymer can be conducted with any of the methods used to form graft copolymers. This includes exposure of an appropriate monomer and polymer mix to high energy radiation; heating a suitable monomer in the presence of the polymer, or reaction of a suitable monomer in the presence of a radical initiator and the polymer. Any other method for graft copolymerizing polymers will be useful in the practice of this invention.

Radical initiation is the most preferred method of preparing the graft polymer. Suitable monomers used in forming grafts by this method include, for example, monoolefinic hydrocarbons such as the styrenes and their derivatives, monolefinically unsaturated esters such as vinyl acetate, vinyl esters of halogenated acids such as vinyl alphachoroacetate, allyl and methallyl compounds such as allyl chloride, esters of alkenyl alcohols such as beta-ethyl allyl alcohol, halo-alkyl acrylates such as methyl alpha-chloroacrylate, alkyl alpha-cyanoacrylates, fumarates such as diethyl fumarate, monoolefinically unsaturated nitriles such as acrylonitrile, amides of previously mentioned acids such as acrylamide, alkyl ethers such as vinyl methyl ether, vinyl sulfides such as vinyl beta ethoxyethyl sulfide, diolefinically unsaturated hydrocarbons such as 1,3 butadiene, and mixtures of the forgoing compounds. Preferred monomers are styrenes, acrylates, methacrylates, vinyl esters, and vinyl halides. Styrenes are most preferred.

Radical initiators can be either water soluble or oil soluble. Water soluble radical initiators include, for example, potassium persulfate, ammonium peroxydisulfate, potassium peroxydisulfate, sodium persulfate, hydrogen peroxide, and water soluble azo initiators. Oil soluble radical initiators include, for example, benzoyl peroxide, t-butyl perbenzoate and 2,2'-azobis(isobutyronitrile). Water soluble initiators are preferred such as potassium persulfate or azo initiators. The concentration of the free radical initiator is about 0.01 to about 0.5 grams per hundred grams of total monomers.

Redox initiation involving an oxidant, such as potassium persulfate or potassium bromate, and a reductant, such as sodium metabisulfite, or tertiary amines, such as triethyl amine, can also be used to initiate the grafting polymerization, particularly at low temperatures.

The process of producing the graft polymer involves contacting the polymer with an initiator in the presence of the monomer used to form the grafted portion of the polymer. Preferably, this is done by introducing the monomer used to form the graft into the oil phase of a dispersion of the polymer and then adding an initiator to the dispersion. A minor amount of agitation such as through stirring or mixing may be applied.

The polymer dispersion to which the graft monomer is added is preferably formed by mixing the polymer with water and a surfactant. Typically, the dispersion will contain more water than polymer on a weight basis although additional aliquots of polymer may be added during emulsification to increase the solids content of the product ultimately formed.

Any surfactant capable of dispersing the polymers in water can be used provided that the material does not interfere in the grafting. Preferably, the surfactants are nonionic and include, for example, polyalkylene glycols generally, and polyalkylene glycol alkyl ethers, polyalkylene glycol alkyl phenyl ethers, polyalkylene glycol fatty acid esters, sorbitan fatty acid esters, alkyl polyglycoxides, fatty acid dialkanol amides, and the like. Typically, the surfactant will comprise about 3 to 15% weight of the polymers used to form the emulsion but any amount which will serve the purpose of getting both polymers and grafting monomer into an emulsion can be used.

The primary amine of general formula (III) and the carbonyl groups of the olefin-carbon monoxide polymer will readily react when heated. Reaction temperatures may be selected from ambient temperature up to about 120° C. Higher temperature may be used, but too high temperatures should be avoided as that might adversely influence the olefin-carbon monoxide polymer and/or might cause the functional group attached to substituent B to react. Preferably, the reaction is conducted at a temperature in the range of 50 to 90° C.

It may be beneficial to force the reaction to stop. For instance, the reaction could be stopped when a conversion of about 95% based on the primary amine of general formula (III) has been reached. This will avoid cross-linking if the primary amine and its functional group are too reactive. The exact reaction time cannot be defined, but may be easily found by the skilled person through limited number of simple experiments. Optionally, the functional group of the primary amine of general formula (III) is protected by reaction with a compound that will leave the primary amino group in tact and may be removed from the functional group after the Knorr-Paal reaction.

It may be helpful to use a solvent during the Knorr-Paal reaction, albeit that the polymers in the preferred range of molecular weight will be liquid or soluble in the liquid primary amine at the reaction temperature. Solvents that can be used include for instance toluene. Preferably no solvent is used.

The invention also relates to the use of the novel polymeric amines of the invention. These novel polymeric amines may be used as curable resin, e.g., when unconverted 1,4-dicarbonyl entities remain, or in curable resin compositions wherein the polymeric amines act as curing agent.

Of particular interest is the use of the novel polymeric amines in water-based resin compositions to form the binder in coating and wood glue formulations. The polymeric amines may be soluble in water by themselves, e.g., when carboxyl functionality is built in, or after quarternization of their amino groups. Water-based resin compositions are preferred over resin compositions based on volatile organic compounds from an HSE point of view. These soluble polymeric amines moreover aid in the formation of stable emulsions or dispersions of other polymers in water, e.g., of polyketones in water.

Quarternization may for instance be carried out using acids such as lactic acid, citric acid, tartaric acid, acetic acid or toluene sulphonic acid. This is, however, not an exhaustive list as many other acids may be used.

Accordingly, the present invention also relates to curable resin compositions based on the novel polymeric amines as curable resin and/or curing agent, and the use of these curable resin compositions as binder in composites, coating and ambient or heat cure wood glue formulations.

The use of resin compositions as binder in the preparation of glued wood products such as plywood, particle board, MDF, OSB and laminated beams is known from PCT/EP95/04324. These resin compositions comprise one or more olefin-carbon monoxide polymers (optionally of different molecular weight), one or more polyamines such as hexamethylenediamine as curing agent and optionally one or more curing catalysts. They may further comprise a diluent and additional components such as viscosity modifiers, flame retardants, gap filling agents, antioxidants, UV stabilisers and colourants. As is shown in PCT/EP95/04324, these resin compositions compare favourably with curable resins based on urea- or phenolformaldehyde.

It has now been found that resin compositions based on the novel polymeric amines surpass the earlier compositions in important properties such as pot-life, ease of handling and strength.

Pot-life is an important property of curable resin compositions, in particular of water-based resin compositions. For instance, in coating and wood glue formulations it is undesirable if the binder prematurely cures upon standing. Excellent pot-life of the resin compositions of the present invention is demonstrated in an experiment. In that experiment the properties of an uncured wood glue formulation are monitored. After three months, no change in viscosity or other property have been identified! However, when used, the wood glue formulation cures as if prepared afresh.

Ease of handling relates amongst others to the viscosity of the curable resin composition. For some applications a high viscosity is required, e.g., when the curable resin composition is applied as a paste, whereas for certain other applications it should be water-thin, e.g., when it is sprayed on. The advantage of the present curable resin composition is that its viscosity may be targeted to suit its application, for instance by using relatively small amounts of water as diluent. Indeed, low viscosities of for instance 1 to 10 Pas are achieved with a solids content of still more than 50% by weight, allowing fast evaporation of the water.

In conventional curable resin compositions the problem of overpenetration exists. The curable resin is soaked into the wood where it does not add to the overall strength of the cured product. As a consequence, lack of bonding occurs due to starvation. Typically, additional and hence expensive curable resin is used to compensate for this loss. The combination of viscosity with high solids content of the present resin compositions, however, negates the need for additional resin composition.

Finally, the curing rate of the resin composition of the present invention may be easily targeted to match that used in conventional processes. Besides, the curable resin composition of the present invention provides excellent bond strength, combined with a high dimensional stability of the cured product and superior water resistance of the bond. The present resin compositions, for instance, have shown to be extremely suitable for plywood. Thus, an extreme endurance test for premium quality plywood comprises prolonged submersion in boiling water (for at least 72 hours). After this test the adhesion of the wood parts, if any, is examined. As is illustrated in the examples, plywood prepared with the present resin compositions passed this test with flying colors.

The curable resin composition may be similar to that disclosed in PCT/EP95/04324. Thus, they may comprise one or more olefin-carbon monoxide polymers (optionally of different molecular weight), the novel polymeric amine and optionally one or more polyamines such as hexamethylenediamine as curing agent and optionally one or more curing catalysts. They may further comprise a diluent and additional components such as viscosity modifiers, flame retardants, gap filling agents, antioxidants, UV stabilisers and colourants.

The amounts of these components can be determined readily by the skilled person, by applying routine experimentation. Typically, the molar ratio of the carbonyl groups in the olefin-carbon monoxide polymer(s) and the primary amine groups of the curing agent is in the range of from 0.25 to 8.0, and suitably in the range of from 0.5 to 4.0.

Suitable quantities of the curing catalyst, if any, range from 0.1 to 15.0% by weight based on the olefin-carbon monoxide polymer. For instance, if weak acids (i.e., having a pKa in the range of from 2 to 5.5, when measured in water at 20° C.) are used, a suitable quantity ranges of from 0.2 to 10.0, in particular 0.5 to 8.0% by weight on the same basis. Examples of such acids include salicylic acid, lactic acid, oxalic acid, and malonic acid. Very good results may be achieved using combinations of Cr, Cu, Ni and Fe salts with salicylic acid.

The presence of a diluent as well as its nature depends on the use of the curable resin composition and the viscosity that is required. The preferred diluent is water. Water can be used, for instance, in amounts ranging from 0.2 to 200% by weight based on the olefin-carbon monoxide polymer.

The curable resin composition may also comprise a polymeric amine as claimed in the present application having both carbonyl functionality and amino functionality. In that case a separate olefin-carbon monoxide polymer is only optional. Thus, the properties of the olefin-carbon monoxide polymer and the polyamine are combined in a single polymer. Such curable resin compositions have been found to have excellent properties too.

The invention further relates to glued products, glued wood products in particular, comprising (wood) parts adhered to one another by means of a cured binder which is obtainable by curing the curable resin composition, and to articles of manufacture comprising a glued wood product according to this invention. Such products may be made analogues to those claimed in PCT/EP95/04324.

The species and the form of the wood parts which are used for producing the glued wood products are not critical. The wood may be high or low density wood and it may be a deciduous or a coniferous wood. Examples of suitable species are oak, chestnut, ash, maple, teak, okoume, mahogany, meranti and pine. Very good results can be obtained with beech, birch, spruce and poplar. The wood does not need any pretreatment other than which may normally be applied when a conventional wood glue formulation is used. It is generally sufficient to bring the wood parts in the size and shape desired for the type of glued wood product to be produced, for example by applying mechanical and/or chemical means. Suitably, the wood is used in the form of planks, veneers, timber, lamellae, chips or pulp. A combination of two or more species or forms of wood parts may be used, for example to improve the appearance of the glued wood product.

The wood may be pre-treated to increase its durability. An example of such pretreatment is with super-heated steam at 150–220° C. under pressure, followed by heating at 100–220° C. at ambient pressure. Another pretreatment is salt impregnation with e.g., chromium, copper, mercury, arsenic salts or combinations thereof.

A further possible use of the composition of the present invention is as adhesive interlayer on solid components, i.e., polymer-based matrices, wood and metal composites, etc. Thus, it may be used to coat reinforcing fillers like natural and synthetic fibers used in structural composites. For instance, many mechanical rubber goods, such as tires, hoses and conveyor belts, contain textile reinforcements for strength and dimensional stability. These composites can only perform well if adhesion between the fibers (typically polyester (PET) or aramid fibers) and rubber is sound.

The invention is illustrated by the following examples, however, without being limited thereto. In these examples an olefin-carbon monoxide polymer as prepared in example 10 of EP-A-0,522,635 was used, that is, having a molecular weight of 2000 daltons, having an olefin:carbonyl mole ratio of 1:1 and being derived from ethene and propene in a mole ratio of 28:72.

EXAMPLE 1
(Synthesis of a Polymeric Amine)

1000 g of the olefin-carbon monoxide polymer is mixed with 370.5 g 1,2-propanediamine. The mixture is heated to 80° C. and stirred until the conversion of the primary amino group on the 1-position reached 95% (240 minutes, determined by potentiometric titration starting from 7300 mmol/kg amine to 3830 mmol/kg).

EXAMPLE 2
(Curable Resin Composition)

A curable resin composition is made by protonating about 50% of the available amino groups of the above polymeric amine with acetic acid at 80° C. Water is added to achieve a 40% solids solution (the amount of water is corrected with the reaction water). The mixture is cooled to ambient temperature and 1000 g of the olefin-carbon monoxide polymer is added together with 24 g salicylic acid (catalyst). Finally, water is added for a 50% solids curable resin composition.

Example 1 and 2 can be carried out in a one-pot synthesis.

EXAMPLE 3a
(Wood Glue Testing EN-314)

The formulation of example 2 is applied as a 100 g/m2 single glue line onto two 20×20 cm birch wood veneer panels of 2 mm thickness. These panels were stacked with a third panel in the middle, with the wood grain of the outer layers in parallel direction and that of the centre layer in cross direction. The package was pressed for 2 minutes at 200° C. at 1.2 Mpa. The triplex so formed was cooled to ambient temperature. It was then cut into sample pieces suitable for the plywood standard testing procedure EN-314. In this test, the samples are subjected to immersion in boiling water for 72 hours and subsequently exposed to a shear test when cooled down but still wet. The triplex should fail by giving wood failure at a shear level of higher than 1.0 Mpa. The samples used in the above testing gave wood failure at shear strength readings of 1.5 to 2.0 MPa.

EXAMPLE 3b
(Wood Glue Testing EN-204)

EN-204 is a commonly used test for judging the quality of wood glues. In this test parallel grain beech planks are subjected to boiling water for 6 hours and subsequently tested for the residual shear strength. The readings should be above 4.0 MPa in wet testing at room temperature after the hot water exposure.

In a comparative test 3 formulations were used:

I. A formulation according to the invention as example 2;

II. The same as I, filled with 13 parts by weight wheat flour and 20 parts by weight coconut shell flour per 100 parts of the curable resin; and III. Dynosol S-576 (tm), an outdoor phenolformaldehyde resin of premium quality.

Beech planks were glued with glue dosages as given in the table below, and pressed for 10 minutes at 140° C. and 2.0 Mpa. The test pieces were exposed to 6 hours of boiling water. The results are shown in the table below:

| Formulation | I | I | II | II | III | III | III |
|---|---|---|---|---|---|---|---|
| Glue dosage g/m2 | 50 | 80 | 65 | 100 | 65 | 100 | 150 |
| amount pure resin g/m2 | 25 | 40 | 25 | 38 | 20 | 31 | 46 |
| filler g/m2 |  |  | 16 | 25 | 15 | 23 | 35 |
| Wet shear strength after boiling MPa | 5.7 | 5 | 4.1 | 5.7 | 3.8 | 7 | 6.2 |

As can be seen from these figures, the curable resin system of the invention passes the EN-204 and EN-314 tests, whereas it can compete with the best commercial product at low dosage.

EXAMPLE 4
(Use as Coating Formulation)

The curable resin composition of example 2 is applied as a 100 g/m2 single coating line on Bar steel panel (Q-panel QD-36). Next, it is cured for 15 minutes at 120° C. The panel was coated with a brown, glossy coating having a thickness of 15 to 20 μm. Its properties were as follows: Direct impact 80 pass according to ASTM D 2794-84. Reverse impact 80 pass according to ASTM D 2794-84. Solvent resistance 100 MEK rubs pass. Adhesion gitterschnitt pass according to ASTM D 2359-83.

EXAMPLE 5
(Evaluation of Diamine Reactivity)

To determine the potential of bis-primary diamines for the present invention, the following experimental procedure has been applied. Two mol equivalents 2,5,8-nonanetrione (in practice 10 g) and 1 mol equivalent of a diamine were mixed in toluene (40 g), whereupon the mixture was refluxed. At regular time intervals samples were withdrawn from the mixture and amine conversion was measured by titration. Suitable amines for this invention showed initial high conversion rates, but less than or equal to 50% amine conversion after 3 hours reflux.

Typical data are:

| diamine | conversion after 3 hours reflux (%) |
|---|---|
| ethylenediamine | 86 |
| hexanediamine | 84 |
| dodecanediamine | 85 |
| m-xylylenediamine | 89 |
| 2-methyl-1, 5-pentanediamine | 82 |
| triethylenetetramine | 98 |
| N-methyldiethylenetriamine | 98 |
| 1, 2-propanediamine | 49 (suitable) |
| isophorondiamine | 32 (suitable) |
| 1, 3-pentanediamine | 49 (suitable |

EXAMPLE 6
(Evaluation as Adhesive Interlayer)

The effect of a curable resin composition according to the invention on the adhesion of a polyester fiber (TOYOBA poly(ethylene-terephthalate) tire yarn of 1018 denier; having a tenacity of 11.4 g/d) with a rubber (CARIFLEX S-1712DF, compounded according to ASTM D 3185, method 2B) was evaluated in a so called H-pull test (ASTM D 2138). In this test a (coated) single fiber is embedded on both ends into a block of rubber which is then vulcanized. After vulcanization the embedded fiber is pulled out of the rubber matrix. The required force is a measure for the adhesion stress.

The curable resin composition according to the invention was manufactured in a manner similar to example 2, although the olefin-carbon monoxide polymer added to the polymeric amine was derived from ethene and propene in a mole ratio of 1:1.

The fibers were used as such or coated with several coating solutions. No special coating application devices were available and the coating was applied on the fibers manually by dipping them into a bath. In order to remove excessive material the fiber was gently wiped with a cloth. Immediately after the coating was applied the mould was prepared and pressed.

The vulcanization was carried out in a mould as prescribed in ASTM D 2138-3, H-test. Vulcanization took place in a non preheated compression moulding machine at 145° C. and 35 bar for 50 minutes. Subsequently the mould was cooled in a cold water bath. The applied conditions guarantee at least a 90% vulcanization of this particular SBR compound.

The samples were evaluated on a INSTRON tensile tester at a cross head speed of 100 mm/min and with a 2 kg load cell. The adhesion strength was calculated as follows: The required force to pull out the bundle of PET fibers was divided by the embedded length in the rubber matrix.

When no coating was applied, the fiber-rubber adhesion force per mm imbedded fiber length amounted to 2 N/mm. When the resin according to the invention was applied, this adhesion force nearly doubled to 3.4 N/mm. Using only the carbon monoxide-olefin copolymer, no improvement was observed.

We claim:

1. Polymeric amines that have N-substituted 2,5-pyrrolediyl groups incorporated in the backbone wherein the N-substituted 2,5-pyrrolediyl group is represented by the general formula (I)

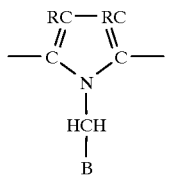
(I)

wherein R independently represents a hydrogen atom or a hydrocarbyl group and wherein B represents a substituent containing at least one primary amino group.

2. The polymeric amines of claim 1, wherein the substituent B is a substituted group of 1 up to 100 atoms having at least one sterically hindered primary amino group attached to it.

3. The polymeric amines of claim 1, wherein the substituent B is represented by the general formula

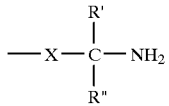

wherein X is a hydrocarbylene or heterocarbylene group of up to 20 atoms, R' and R" each individually represent a hydrocarbyl or heterocarbyl group of up to 10 atoms or R" is a hydrogen atom.

4. The polymeric amines of claim 1 wherein the substituent B is 1-aminoethyl.

5. The polymeric amine of claim 1 represented by the general formula (II)

—(—A—CO—)l—(—2,5-NPy—)m—(—2,5-Py—)n    (II)

wherein each A independently represents a substituted or unsubstituted alkadiyl group; l, m and n are integers together representing the number of repeating units p whereby $1 \leq m \leq p$, $0 \leq l+n < p$ and $p \geq 3$; each 2,5-NPy represents the N-substituted 2,5-pyrrolediyl group wherein the pyrrolic nitrogen atom is substituted with a group comprising a primary amino group, and each 2,5-Py represents an N-substituted 2,5-pyrrolediyl group having no functionality or a functionality other than a primary amino group.

6. The polymeric amine of claim 5 wherein $2 \leq m \leq p$.

7. The polymeric amines of claim 5, wherein each A of this repeating unit is a substituted or unsubstituted 1,2- or 1,3-alkenyl.

8. The polymeric amine of claim 7 wherein each A is a substituted or unsubstituted 1,2-alkenyl.

9. The polymeric amines of claim 5 wherein the repeating unit (2,5-Py) is a 2,5-pyrrolediyl group wherein the pyrrolic nitrogen atom bears a component selected from the group consisting of a hydrogen atom, an alkyl group, an aryl group, an alkenyl group, a tertiary aminoalkyl group, an (N-pyrrole)alkyl group, and mixtures thereof.

10. A process for the preparation of the polymeric amines, the process comprising the steps of:

reacting an olefin-carbon monoxide polymer with a primary amine of general formula (III)

$$H_2NCH_2—B \quad (III)$$

wherein B represents a substituent comprising at least one primary amino group, under such conditions to form the 2,5-pyrrolediyl groups without affecting the primary amino group attached to the substituent B; and recovering a polymeric amine that has N-substituted 2,5-pyrrolediyl groups incorporated in the backbone wherein the N-substituted 2,5-pyrrolediyl group is represented by the general formula (I)

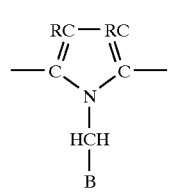
(I)

wherein R independently represents a hydrogen atom or a hydrocarbyl group and wherein B represents the substituent containing at least one primary amino group.

* * * * *